US010168014B2

(12) United States Patent
Lee

(10) Patent No.: US 10,168,014 B2
(45) Date of Patent: Jan. 1, 2019

(54) HEAD LAMP APPARATUS

(71) Applicant: HYUNDAI MOBIS CO., LTD., Seoul (KR)

(72) Inventor: Hyun Soo Lee, Seongnam-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 15/789,766

(22) Filed: Oct. 20, 2017

(65) Prior Publication Data
US 2018/0313511 A1     Nov. 1, 2018

(30) Foreign Application Priority Data
Apr. 26, 2017   (KR) ........................ 10-2017-0053262

(51) Int. Cl.
| | |
|---|---|
| *F21S 41/20* | (2018.01) |
| *F21S 41/25* | (2018.01) |
| *B60Q 1/04* | (2006.01) |
| *F21S 41/141* | (2018.01) |
| *F21W 102/00* | (2018.01) |
| *F21S 41/151* | (2018.01) |

(52) U.S. Cl.
CPC ................ *F21S 41/28* (2018.01); *B60Q 1/04* (2013.01); *F21S 41/141* (2018.01); *F21S 41/25* (2018.01); *F21S 41/285* (2018.01); *F21S 41/151* (2018.01); *F21W 2102/00* (2018.01)

(58) Field of Classification Search
CPC ... B60Q 1/04; F21S 41/20; F21S 41/28; F21S 41/285; F21S 41/25–41/27; F21W 2102/00–2102/165
See application file for complete search history.

(56) References Cited

FOREIGN PATENT DOCUMENTS

| JP | 2014-143200 A | 8/2014 |
| JP | 2016-212962 A | 12/2016 |
| KR | 10-2016-0101539 A | 8/2016 |

OTHER PUBLICATIONS

Office Action in corresponding Korean Patent Application No. 10-2017-0053262—4 pages, (dated Mar. 19, 2018).

*Primary Examiner* — Mariceli Santiago
(74) *Attorney, Agent, or Firm* — Knobbe Martens Olson & Bear LLP

(57) ABSTRACT

A head lamp apparatus may include: a light source unit including first and second light sources; a lens separated from the light source unit; a first optic rod having a first light receiving surface, and emitting light received from the first light source toward the lens through a first light emitting surface; and a second optic rod having a second light receiving surface, and emitting light received from the second light source toward the lens through a second light emitting surface. At least one of the first and second light emitting surfaces may be positioned on a Petzval surface of the lens.

10 Claims, 4 Drawing Sheets

HEAD LAMP APPARATUS

CROSS-REFERENCES TO RELATED APPLICATIONS

The present application claims priority to Korean application number 10-2017-0053262, filed on Apr. 26, 2017, which is incorporated by reference in its entirety.

BACKGROUND OF THE INVENTION

The present invention relates to a head lamp apparatus, and more particularly, to a head lamp apparatus that illuminates the front area of a vehicle.

In general, a vehicle includes a head lamp apparatus to illustrate the front area of the vehicle when the visibility is poor, for example, in the night time.

Since a conventional head lamp apparatus includes a plurality of light sources and optic rods, the manufacturing cost of the head lamp apparatus is high. Furthermore, since the plurality of optic rods have the same size, it is difficult to implement a beam pattern or cut-off shape in various manners. Therefore, there is a demand for an apparatus capable of solving the problem.

SUMMARY OF THE INVENTION

Embodiments of the present invention are directed to a head lamp apparatus which is capable of reducing the numbers of LED light sources applied to low and high beams, implementing various beam patterns by applying a different cut-off shape to each light, and forming gradient light.

In one embodiment, a head lamp apparatus may include: a light source unit including first and second light sources; a lens separated from the light source unit; a first optic rod having a first light receiving surface, and emitting light received from the first light source toward the lens through a first light emitting surface; and a second optic rod having a second light receiving surface, and emitting light received from the second light source toward the lens through a second light emitting surface. At least one of the first and second light emitting surfaces may be positioned on a Petzval surface of the lens.

At least one of the first and second light emitting surfaces may be inclined in a direction away from the Petzval surface.

The first light emitting surface may have a larger area than the first light receiving surface.

The second light emitting surface may have a larger area than the second light receiving surface.

The first optic rod may include: a first light receiving part having the first light receiving surface formed thereon, and formed in a shape of which the cross-sectional area increases and then decreases toward the first light emitting surface; and a first light emitting part having the first light emitting surface formed thereon, connected to the first light receiving part, and formed in a shape of which the cross-sectional area increases toward the first light emitting surface.

The first optic rod may have a first contact surface formed as a flat surface, the first contact surface facing the second optic rod, and a separation deposition surface may be formed between the first contact surface and the second optic rod, and prevent an interference between the lights guided by the first and second optic rods.

The first optic rod may have a first outer surface corresponding to the opposite surface of the first contact surface, the first outer surface including a Bezier surface.

The second optic rod may include a second contact surface facing the first optic rod, and the second contact surface may be formed as a flat surface.

The head lamp apparatus may include a plurality of first light sources, and a plurality of first light receiving parts may be installed to correspond to the plurality of first light sources, respectively.

The first light emitting part may have a shape of which the thickness decreases from the widthwise center toward the outside in the widthwise direction.

The first light source may serve as a low-beam light source, and the second light source may serve as a high-beam light source.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
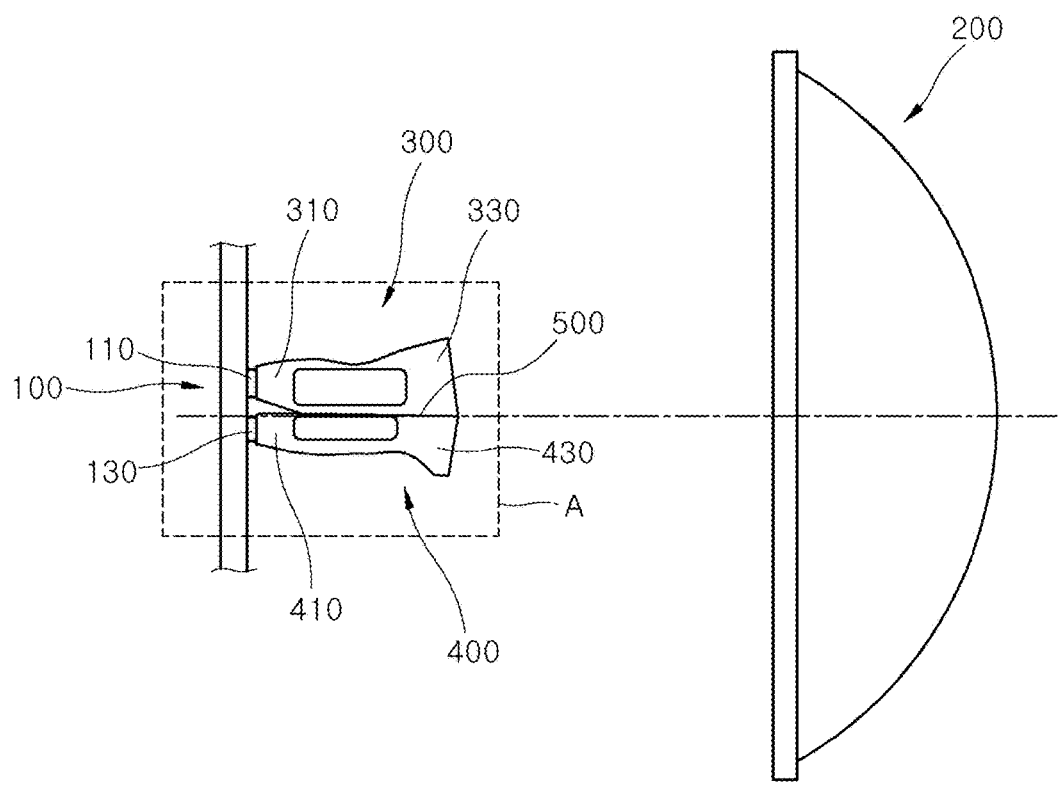
FIG. 1 is a schematic side view of a head lamp apparatus in accordance with an embodiment of the present invention.
Figure 2:
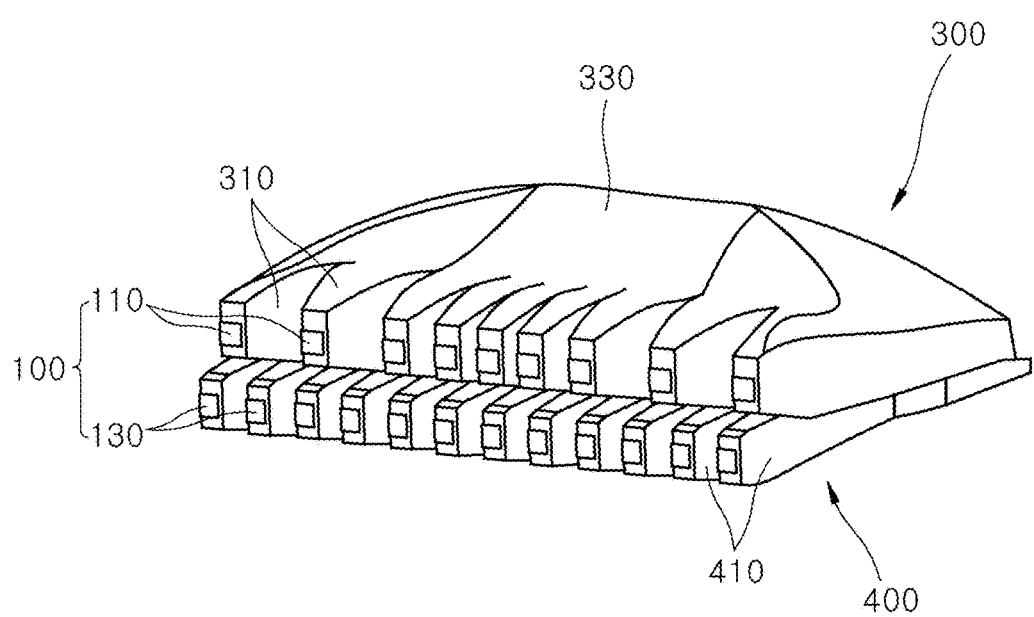
FIG. 2 is a schematic perspective view of optic rods in accordance with the embodiment of the present invention.
Figure 3:
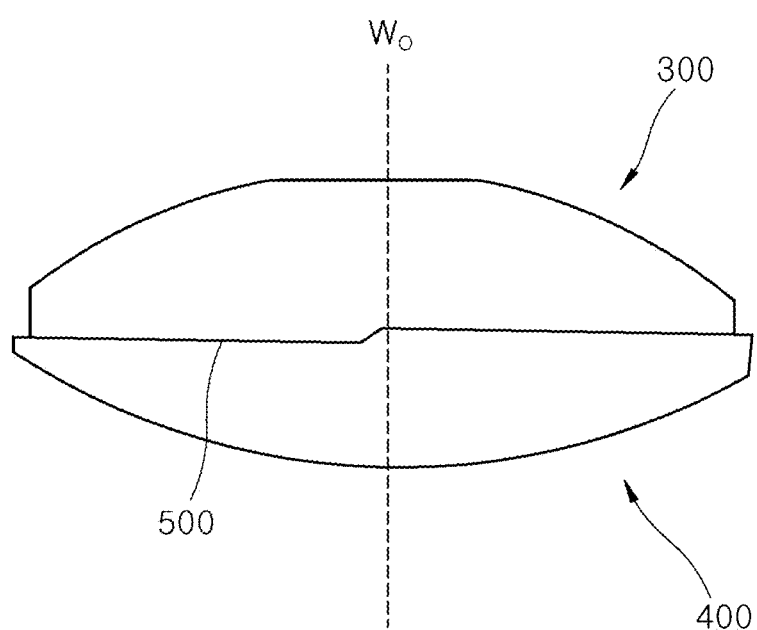
FIG. 3 is a schematic front view of the optic rods in accordance with the embodiment of the present invention.
Figure 4:
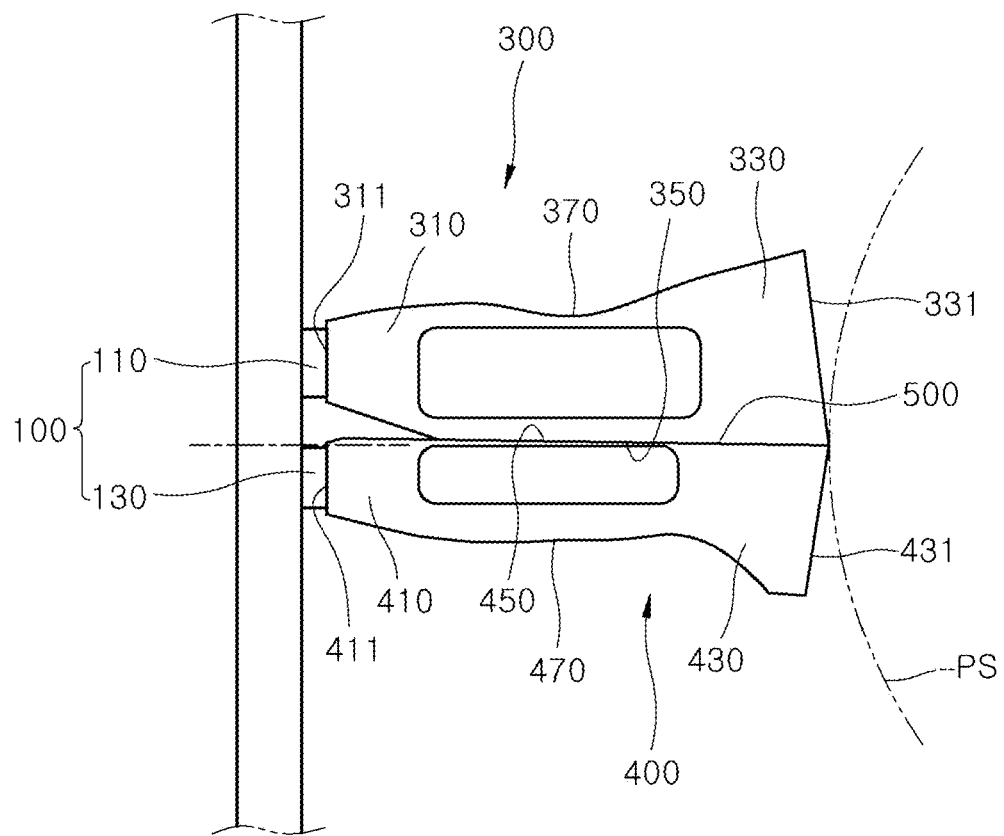
FIG. 4 illustrates a portion A of FIG. 1.

FIG. 1 is a schematic side view of a head lamp apparatus in accordance with an embodiment of the present invention, FIG. 2 is a schematic perspective view of optic rods in accordance with the embodiment of the present invention, FIG. 3 is a schematic front view of the optic rods in accordance with the embodiment of the present invention, and FIG. 4 illustrates a portion A of FIG. 1.

Referring to FIGS. 1 to 4, the head lamp apparatus 1 in accordance with the present embodiment may include a light source unit 100, a lens 200, a first optic rod 300 and a second optic rod 400, and transfer light generated from the light source unit 100 to the lens 200 through the first or second optic rod 300 or 400.

The light source unit 100 may include first and second light sources 110 and 130 to generate light. In the present embodiment, the first and second light sources 110 and 130 may include LEDs to generate light. In addition to LEDs, however, various light sources can be applied as long as they can generate light.

The first and second light sources 110 and 130 may serve as a low-beam light source and a high-beam light source, respectively. Light generated by the first light source 110 may be transferred to the lens 200 through the first optic rod 300, and light generated by the second light source 130 may be transferred to the lens 200 through the second optic rod 400.

The lens 200 may be separated from the light source unit 100, and emit light to the outside, the light being received through the first and second optic rods 300 and 400. In the present embodiment, the lens 200 may be mounted on the vehicle body, specifically at the front end of the vehicle body, such that the light emitted from the lens 200 can illuminate the front area of the vehicle body.

In the present embodiment, the lens 200 may include an aspheric lens, and emit the light received from the first and second optic rods 300 and 400 in a preset direction to form a desired beam pattern.

The first optic rod 300 may have a first light receiving surface 311 to guide light received from the first light source 110 toward the lens 200 through a first light emitting surface 331.

In the present embodiment, a distance between the first light receiving surface 311 and the first light source 110 may be set to approximately 0.5 mm or less, in order to prevent a loss of light generated by the first light source 110.

Furthermore, the first light emitting surface 331 may have a larger area than the first light receiving surface 311. Such a structure can improve the directivity of light and suppress diffuse reflection, thereby preventing a loss of light.

In the present embodiment, the first optic rod 300 may connect the first light receiving surface 311 and the first light emitting surface 331, and transfer light inputted to the first light receiving surface 311 to the first light emitting surface 331. The first optic rod 300 may include a first light receiving part 310 and a first light emitting part 330.

The first light receiving surface 311 may be formed at one end of the first light receiving part 310, facing the first light source 110, and the first light receiving part 310 may have a first outer surface 370 formed in a convex shape, such that the cross-sectional area thereof increases and then decreases toward the first light emitting surface 331 or the first light emitting part 330 (refer to FIG. 4).

The first outer surface 370 may be implemented with a Bezier surface that can improve the luminance of a hot zone.

The head lamp apparatus in accordance with the present embodiment may include a plurality of first light sources 110 arranged therein. Thus, a plurality of first light receiving parts 310 may be arranged to correspond to the respective first light sources 110, and receive light from the corresponding first light sources 110.

The first light emitting part 330 may have a large width in the side-to-side direction of FIG. 3, such that the plurality of first light receiving parts 310 can be connected to the first light emitting part 330. The first light emitting part 330 may transfer light received from the plurality of first light receiving parts 310 to the lens 200 through the first light emitting surface 331.

The first light emitting part 330 having the first light emitting surface 331 may be connected to the first light receiving parts 310. The first light emitting part 330 may have a cross-sectional area that increases toward the first light emitting surface 331, and can improve the directivity of light while suppressing diffuse reflection, thereby preventing a loss of light.

In the present embodiment, the first optic rod 300 may include a first contact surface 350 facing the second optic rod 400, and the first contact surface 350 may be formed with a flat surface.

Between the first contact surface 350 and the second optic rod 400, a separation deposition surface 500 may be formed. The separation deposition surface 500 may be made of aluminum and prevent interference between lights guided by the first and second optic rods 300 and 400, respectively.

In the present embodiment, the first light emitting part 330 may be formed in a shape of which the thickness decreases from the widthwise center $W_o$ toward the outside in the widthwise direction (the side-to-side direction based on FIG. 3), thereby reducing a protrusion of beam pattern in a specific direction, the beam pattern being formed through the lens 200.

In the present embodiment, one end of the first light emitting surface 331 may be positioned on a Petzval surface PS of the lens 200, and the first light emitting surface 331 may get away from the Petzval surface toward the other end thereof.

Specifically, the first light emitting surface 331 may have a structure that secures illuminance required for front illumination through light emission from the position of the first light emitting surface 331 on the Petzval surface PS, and gets away from the Petzval surface PS toward the other end (upper end in FIG. 4). Therefore, an optic pattern using the plurality of intermittent first light sources 110 may become a gradient beam pattern.

The second optic rod 400 may be positioned at one side of the first optic rod 300, and pressed against the first optic rod 300 with the separation deposition surface 500 interposed therebetween.

The second optic rod 400 may include the second light receiving surface 411 to guide light received from the second light source 130 toward the lens 200 through the second light emitting surface 431.

In the present embodiment, a distance between the second light receiving surface 411 and the second light source 130 may be set to approximately 0.5 mm or less, in order to prevent a loss of light generated by the second light source 130 while the light is transferred to the second light receiving surface 411.

Furthermore, the second light emitting surface 431 may have a larger area than the second light receiving surface 411. Such a structure can improve the directivity of light and suppress diffuse reflection, thereby preventing a loss of light.

In the present embodiment, the second optic rod 400 may connect the second light receiving surface 411 and the second light emitting surface 431, and transfer light inputted to the second light receiving surface 411 to the second light emitting surface 431. The second optic rod 400 may include a second light receiving part 410 and a second light emitting part 430.

The second light receiving surface 411 may be formed at one end of the second light receiving part 410, facing the second light source 130 (the left end in FIG. 4), and the second optic rod 400 may have a second outer surface 470 formed in a convex curved shape such that the cross-sectional area thereof increases and then decreases toward the second light emitting surface 431 or specifically the second light emitting part 430.

The second outer surface 470 may be implemented with a Bezier surface that can improve the luminance of a hot zone.

The head lamp apparatus in accordance with the present embodiment may include a plurality of second light sources 130 arranged therein. Thus, a plurality of second light receiving parts 410 may be arranged to correspond to the respective second light sources 130, and receive light from the corresponding second light sources 130.

The second light emitting part 430 may have a large width in the side-to-side direction of FIG. 3, such that the plurality of second light receiving parts 410 can be connected to the second light emitting part 430. The second light emitting part 430 may transfer light received from the plurality of second light receiving parts 410 to the lens 200 through the second light emitting surface 431.

The second light emitting part 430 having the second light emitting surface 431 formed thereon may be connected to the second light receiving part 410. Since the second light emitting part 430 has a cross-sectional area that increases toward the second light emitting surface 431, the second light emitting part 430 can improve the directivity of light and suppress diffuse reflection, thereby preventing a loss of light.

In the present embodiment, the second optic rod 400 may include a second contact surface 450 facing the first optic rod 300, and the second contact surface 450 may be formed as a flat surface.

The second light emitting part 430 may be formed in a shape of which the thickness decreases from the widthwise center $W_o$ toward the outside in the widthwise direction, thereby reducing a protrusion of beam pattern in a specific direction, the beam pattern being formed through the lens 200.

In particular, when the second optic rod 400 guides light to form a high beam, the upper left and right ends of the beam pattern may be formed in a protrusion shape. Then, the beam pattern may confuse a driver when the driver recognizes the road surface. In the present embodiment, since the second optic rod 400 is formed in a shape of which the thickness decreases toward the outside in the widthwise direction, the second optic rod 400 can reduce the extent of protrusion, thereby preventing a confusion during the road recognition of the driver.

In the present embodiment, the second light emitting surface 431 may be inclined in such a manner that one end thereof is located on the Petzval surface PS of the lens 200 and the second light emitting surface 431 gets away from the Petzval surface PS toward the other end thereof.

Thus, the second light emitting surface 431 may have a structure that secures illuminance required for front illumination through light emission from the position of the second light emitting surface 431 on the Petzval surface PS, and gets away from the Petzval surface PS toward the other end. Therefore, an optic pattern using the plurality of intermittent second light sources 130 may become a gradient beam pattern.

Hereafter, the operation principle and effect of the head lamp apparatus 1 in accordance with the embodiment of the present invention will be described as follows.

Light generated by the light source unit 100 may be transferred to the lens 200 through the first or second optic rod 300 or 400, and then emitted to form a preset beam pattern.

Specifically, light generated by the first light source 110 may be transferred to the first light receiving part 310 through the first light receiving surface 311, transferred to the first light emitting part 330, and then emitted through the first light emitting surface 331.

In the present embodiment, the plurality of first light sources 110 may be installed to emit light, and the first light emitting surface 331 may have a structure that gets away from the Petzval surface PS toward the other end thereof while one end thereof is positioned on the Petzval surface PS. Thus, illuminance for illumination can be secured, and a plurality of lights generated by the plurality of intermittent first light sources 110 may form a gradient beam pattern.

In the present embodiment, the lights generated by the first light sources 110 may act as a low beam to form a beam pattern through the first optic rod 300 and the lens 200.

Furthermore, light generated by the second light source 130 may be transferred to the second light receiving part 410 through the second light receiving surface 411, transferred to the second light emitting part 430, and then emitted through the second light emitting surface 431.

In the present embodiment, the plurality of second light sources 130 may be installed to emit light, and the second light emitting surface 431 may have a structure that gets away from the Petzval surface PS toward the other end thereof while one end thereof is positioned on the Petzval surface PS. Thus, illuminance for illumination can be secured, and a plurality of lights generated by the plurality of intermittent second light sources 130 may form a gradient beam pattern.

In the present embodiment, lights generated by the second light sources 130 may act as a high beam to form a beam pattern through the second optic rod 400 and the lens 200.

In particular, the second light emitting part 430 may have a thickness that decreases from the widthwise center $W_o$ toward the outside in the widthwise direction, the thickness corresponding to a distance between the top and bottom surfaces of the second light emitting part 430. Such a structure can reduce a protrusion of the upper left and right ends of the beam pattern of the high beam, thereby reducing a confusion of the driver.

The head lamp apparatus 1 in accordance with the present embodiment may include the optic rods 300 and 400 to guide low and high beams, respectively, implement a cut-off shape according to the low and high beams, and optimize the numbers of light sources applied to the low and high beams.

The head lamp apparatus 1 in accordance with the present embodiment can adjust the space between the light emitting surfaces 331 and 431 and the Petzval surface PS, thereby not only securing illuminance and implementing a gradient beam pattern.

The head lamp apparatus 1 in accordance with the present embodiment may have the separation deposition surface 500 between the first and second optic rods 300 and 400, and prevent interference between the lights guided by the first and second optic rods 300 and 400.

The head lamp apparatus 1 can change the shapes of the light emitting parts 330 and 430, thereby preventing a formation of protrusion pattern at the upper left and right ends of the beam pattern or specifically the high beam pattern.

In accordance with the present embodiment, the head lamp apparatus may include the optic rods for guiding high and low beams, thereby implementing cut-off shapes according to the high and low beams.

Furthermore, the head lamp apparatus can adjust the space between the light emitting surfaces and the Petzval surface, thereby not only securing illuminance but also implementing a gradient beam pattern.

Furthermore, the head lamp apparatus may include the separation deposition surface formed between the first and second optic rods, thereby preventing an interference between lights guided by the first and second optic rods.

Furthermore, the head lamp apparatus can change the shapes of the light emitting parts, thereby reducing a protrusion of the beam pattern or specifically the high beam pattern.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A head lamp apparatus comprising:
a light source unit comprising first and second light sources;
a lens separated from the light source unit;
a first optic rod having a first light receiving surface, and configured to emit light received from the first light source toward the lens through a first light emitting surface; and
a second optic rod having a second light receiving surface, and configured to emit light received from the second light source toward the lens through a second light emitting surface,
wherein at least one of the first and second light emitting surfaces is positioned on a Petzval surface of the lens,
wherein at least one of the first and second light emitting surfaces is inclined in a direction away from the Petzval surface.

2. The head lamp apparatus of claim 1, wherein the first light emitting surface has a larger area than the first light receiving surface.

3. The head lamp apparatus of claim 1, wherein the first light source configured to serve as a low-beam light source, and the second light source configured to serve as a high-beam light source.

4. A head lamp apparatus comprising:
a light source unit comprising first and second light sources;
a lens separated from the light source unit;
a first optic rod having a first light receiving surface, and configured to emit light received from the first light source toward the lens through a first light emitting surface; and
a second optic rod having a second light receiving surface, and configured to emit light received from the second light source toward the lens through a second light emitting surface,
wherein at least one of the first and second light emitting surfaces is positioned on a Petzval surface of the lens,
wherein the first light emitting surface has a larger area than the first light receiving surface,
wherein the second light emitting surface has a larger area than the second light receiving surface.

5. A head lamp apparatus comprising:
a light source unit comprising first and second light sources;
a lens separated from the light source unit;
a first optic rod having a first light receiving surface, and configured to emit light received from the first light source toward the lens through a first light emitting surface; and
a second optic rod having a second light receiving surface, and configured to emit light received from the second light source toward the lens through a second light emitting surface,
wherein at least one of the first and second light emitting surfaces is positioned on a Petzval surface of the lens,
wherein the first optic rod comprises:
a first light receiving part having the first light receiving surface formed thereon, and formed in a shape of which a cross-sectional area increases and then decreases toward the first light emitting surface; and
a first light emitting part having the first light emitting surface formed thereon, connected to the first light receiving part, and formed in a shape of which a cross-sectional area increases toward the first light emitting surface.

6. The head lamp apparatus of claim 5, wherein the first optic rod has a first contact surface formed as a flat surface, the first contact surface facing the second optic rod, and
a separation deposition surface is formed between the first contact surface and the second optic rod, and configured to prevent an interference between the lights guided by the first and second optic rods.

7. The head lamp apparatus of claim 6, wherein the first optic rod has a first outer surface corresponding to the opposite surface of the first contact surface, the first outer surface including a Bezier surface.

8. The head lamp apparatus of claim 6, wherein the second optic rod comprises a second contact surface facing the first optic rod, and the second contact surface is formed as a flat surface.

9. The head lamp apparatus of claim 5, wherein the head lamp apparatus comprises a plurality of first light sources, and
a plurality of first light receiving parts are installed to correspond to the plurality of first light sources, respectively.

10. The head lamp apparatus of claim 5, wherein the first light emitting part has a shape of which the thickness decreases from the widthwise center toward the outside in the widthwise direction.

* * * * *